United States Patent
Düppre

(10) Patent No.: US 10,775,224 B2
(45) Date of Patent: Sep. 15, 2020

(54) WEIGHING SYSTEMS, METHODS, AND INSTALLATIONS FOR WEIGHING SELECTED PRODUCTS TRANSPORTED IN MULTIPLE LANES AND/OR SEQUENTALLY

(71) Applicant: Wipotec GmbH, Kaiserslautern (DE)

(72) Inventor: Theo Düppre, Kaiserslautern (DE)

(73) Assignee: Wipotec GmbH, Kaiserslautern (DE)

( * ) Notice: Subject to any disclaimer, the term of this patent is extended or adjusted under 35 U.S.C. 154(b) by 232 days.

(21) Appl. No.: 15/947,498

(22) Filed: Apr. 6, 2018

(65) Prior Publication Data

US 2018/0292253 A1    Oct. 11, 2018

(30) Foreign Application Priority Data

Apr. 7, 2017  (DE) .......................... 10 2017 107 586

(51) Int. Cl.
*G01G 11/00* (2006.01)
*G01G 19/03* (2006.01)
*G01G 11/04* (2006.01)
*G01G 17/00* (2006.01)

(52) U.S. Cl.
CPC ........... *G01G 11/003* (2013.01); *G01G 11/04* (2013.01); *G01G 17/00* (2013.01); *G01G 19/03* (2013.01)

(58) Field of Classification Search
CPC ...... G01G 11/00; G01G 11/003; G01G 11/04; G01G 11/043; G01G 15/00; G01G 19/03
See application file for complete search history.

(56) References Cited

U.S. PATENT DOCUMENTS

| 3,545,588 | A | * | 12/1970 | Corley | ....................... | B65C 9/02 |
| | | | | | | 198/345.1 |
| 3,643,798 | A | | 2/1972 | Krupotich | | |
| 3,651,936 | A | | 3/1972 | Powell | | |
| 3,955,665 | A | * | 5/1976 | Pettis, Jr. | ................ | G01G 15/00 |
| | | | | | | 177/145 |
| 4,718,146 | A | * | 1/1988 | Adkison | .............. | G01G 11/003 |
| | | | | | | 452/152 |
| 5,306,877 | A | * | 4/1994 | Tas | ............................. | B07C 5/18 |
| | | | | | | 177/145 |
| 6,252,181 | B1 | * | 6/2001 | Fallas | ..................... | G01G 15/00 |
| | | | | | | 177/119 |

(Continued)

FOREIGN PATENT DOCUMENTS

| DE | 103 56 619 A1 | | 6/2005 | | |
| FR | 2310553 | * | 5/1975 | ............. | G01G 11/00 |

(Continued)

OTHER PUBLICATIONS

Machine translation of FR2310553.*

(Continued)

*Primary Examiner* — Natalie Huls

(74) *Attorney, Agent, or Firm* — The Culbertson Group, P.C.

(57) ABSTRACT

A device and method for the non-formatted weighing of a group of products. The products rest either on a positioning surface or on a supporting surface and, due to the relative movement of the two surfaces with respect to one another, are transferred from one surface to the other surface. By the acquisition of the weight of at least one of the two surfaces, the weight of each individual product can be determined.

20 Claims, 6 Drawing Sheets

(56) References Cited

U.S. PATENT DOCUMENTS

| | | | | |
|---|---|---|---|---|
| 8,716,608 | B2* | 5/2014 | Karlsson | G01G 15/00 177/1 |
| 9,726,534 | B2* | 8/2017 | Gempp | G01G 19/03 |
| 2009/0032311 | A1 | 2/2009 | Düppre | |

FOREIGN PATENT DOCUMENTS

| | | |
|---|---|---|
| GB | 2 326 488 A | 12/1998 |
| JP | 4532310 | 12/1970 |
| JP | 58141831 | 9/1983 |
| JP | 5920816 | 2/1984 |
| JP | 200239845 | 2/2002 |

OTHER PUBLICATIONS

Machine translation of DE10356619.*
German Patent Office Action in DE 10 2017 107 586.0, dated Jan. 8, 2018.
German Patent Office Action in DE 10 2017 107 586.0, dated Feb. 9, 2018.
Japan patent application No. 2018-073558, Office Action dated May 27, 2019.

\* cited by examiner

A

WEIGHING SYSTEMS, METHODS, AND INSTALLATIONS FOR WEIGHING SELECTED PRODUCTS TRANSPORTED IN MULTIPLE LANES AND/OR SEQUENTALLY

TECHNICAL FIELD OF THE INVENTION

The present invention relates to a weighing system for the weighing of several products that may have different sizes and shapes and are transported in multiple lanes and/or sequentially.

BACKGROUND OF THE INVENTION

In the food industry, products of any shape and size and in any position are conveyed and weighed. The products are weighed either dynamically or statically. In static weighing, the transport system is stopped, and the product is weighed before it is transported onward (start/stop system). In dynamic weighing, the products are weighed while being transported. Multilane systems that use several weighing cells arranged side by side achieve a particularly high throughput.

In contemporary industrial production, the weighing system used must be suitable for high product throughputs and for any product formats (that is, products of any size and shape and/or in any spatial orientation), in order to avoid retrofitting to the extent possible. If several weighing cells are arranged side by side in a multilane weighing system, the case can occur, for example, that a product loads three weighing cells, while an adjacent second product simultaneously also loads one or more of these weighing cells, that is to say the products "share" weighing cells. Although the total weight of the two products can be acquired as a sum of the partial weights of all the loaded weighing cells, the individual weight is nevertheless not determinable. This problem could be avoided by adjusting the weighing cell number taking into consideration the product size and the product position. However, in the case of alternating product sizes, this adjustment is time consuming and cost intensive. A rapid acquisition of the individual weights of adjacently or sequentially transported products is not possible in this manner. Frequently, the products to be weighed also have to be positioned relatively accurately for the weight acquisition, so that, for example, minimum spacings between the products, both in the conveyance direction and also transversely thereto, must be complied with.

From DE 10 2005 055 755 A1, a method for weighing with several weighing cells is known, in which several weighing cells are arranged side by side and in which the weight of a product to be weighed can be distributed over several of these weighing cells. By coupling the respective weighing signals, the weight of this product can then be calculated from the partial weights acquired.

U.S. Pat. No. 3,643,798 describes a weighing and sorting device for letters, in which, as needed, rolls can be moved in the vertical direction so that supporting rods protruding between them can temporarily receive a letter previously lying on the rolls. The supporting rods are coupled with a weighing cell, in order to acquire the weight of the letter. However, this device as well does not make it possible to promptly acquire the individual weights of multiple products provided side by side or one after the other.

SUMMARY OF THE INVENTION

The aim of the present invention therefore is to provide a weighing system for overcoming the above-mentioned disadvantages. The weighing system should allow the weighing of products provided in multiple lanes and/or sequentially, with simultaneously low construction effort and high product throughput even where the products vary in size and shape, and in spatial orientation.

The invention is based on the insight that the individual weight of several products provided simultaneously can be determined rapidly in that their respective weight force is supplied sequentially in an additive manner to the load receiver of a weighing cell or is decoupled in a subtractive manner from said load receiver. This occurs according to the invention in that the products load or unload the load receiver sequentially, so that, from the respective resulting difference between two loading events, the weight force of the respective product which has been added or removed can be deduced.

A particular advantage of some embodiments according to the present invention is that, using only one weighing cell and in a relatively fast weighing method, the individual weights of several products can be acquired, which considerably reduces the construction effort in comparison to the prior art and allows an accelerated weighing. The solution according to the invention at the same time allows the weighing of products having different formats, that is, different sizes and shapes (non-formatted weighing), without the need to prepare or retrofit the weighing system in a special manner for this purpose. Various embodiments according to the invention may employ two surfaces that are each configured to support a number of products to be weighed. The two surfaces penetrate one another and at least one of the surfaces is coupled with the load receiver of a weighing cell, so that the weight force of the products resting on this surface can be acquired by the weighing cell. The other surface may not be coupled with a weighing cell, so that the weight force of the products resting on this surface is decoupled in particular from the above-mentioned weighing cell. In these embodiments of the invention, the two surfaces can be moved relative to one another in such a manner that, in the course of this movement, a specifiable number of products is transferred from one surface to the other surface, so that the weight force thereof additionally loads or unloads the weighing cell after the transfer. In particular, the movement can occur in such a manner that precisely one product is transferred from one surface to the other surface, and the weight of the transferred product can be deduced from the difference of the measured value of the weighing cell acquired before and after.

Here, a "weighing cell" is understood to mean a device that generates, from a weight force supplied to it, an analog or digital measured value that is dependent on said weight force. The weighing cell can contain additional components, for example, load receiving or load introduction elements.

The movement of the two surfaces relative to one another may occur by translation. In particular, one of the two surfaces can remain substantially stationary, while the other surface is lowered or raised relative to the former surface, in order to thus deliver products to the other surface or remove products therefrom. The two surfaces are preferably oriented approximately horizontally and inclined by a preferably small angle α in the range of 5° to 15°, preferably in the range of 8° to 9°, with respect to one another, so that the products can rest freely on the two surfaces without slipping due to their own weight. The structural design of the surfaces that penetrate one another is possible in various manners, wherein embodiment examples are described in further detail with reference to the figures.

A weighing system according to the invention is provided for the non-formatted weighing of a number (m) of at least two products that are provided in multiple lanes and/or sequentially. "In multiple lanes" and "sequentially" here refers to an imaginary conveyance direction in which the products are supplied to the weighing system. Products supplied in multiple lanes can here lie side by side transversely to the conveyance direction, while sequentially provided products are arranged one after the other in the conveyance direction. In a special embodiment, the products can also be provided simultaneously in multiple lanes and sequentially, that is to say in matrix form.

In some embodiments a weighing system according to the present invention includes a positioning surface as one of the two surfaces that can be moved relative to one another. On the positioning surface, a subset (k) of the number (m) of the products can be positioned, wherein here the pseudo subsets k=0 and k=m should also be included.

Such a weighing system moreover includes a supporting surface that corresponds to the second of the two above-mentioned surfaces. In a manner similar to the positioning surface, the supporting surface is also formed for the support of a subset (n) of the number (m) of the products, wherein here too the pseudo subsets n=0 and n=m should be included. Moreover, the term "support" of a product on the positioning surface or supporting surface should be understood to mean that the product rests completely on the respective surface, that is to say that its weight force is introduced completely only into this respective surface. It follows from this definition that a product cannot "rest" simultaneously on the positioning surface and on the supporting surface, that is to say that it cannot introduce its full weight force simultaneously into the two surfaces. However, this does not rule out that, during the transfer from one to the other surface, the product is simultaneously temporarily in contact with the two surfaces, and accordingly distributes its weight force over the two surfaces. Moreover, it follows from the above-mentioned definition that the respective subsets (k) and (n) always add up to the total number (m) of the products.

The positioning surface and the supporting surface are not completely closed surfaces. Instead, they in each case result from a series of individual support areas adjacent to one another, wherein each product can rest simultaneously on several adjacent support areas of a surface, so that the individual support areas functionally complete one another to form one surface. Interstices remaining between the support areas of one surface can be used according to the invention for support areas of the respective other surface, so that the two surfaces also can intersect or penetrate one another in such a manner that sections of the positioning surface can lie above or below sections of the supporting surface. Due to relative movement of the two surfaces with respect to one another, the respective sections of the individual surfaces, which lie on top of each other or below one another, change or shift with respect to one another accordingly.

A weighing system according to aspects of the invention may include a number (d) of supporting elements which lie side by side, preferably in a comb-like manner, and which protrude substantially vertically. The upper ends of the individual supporting elements form the supporting surface according to the above-described embodiments.

Furthermore, a weighing system embodying the principles of the invention may include at least one load receiver for receiving the weight force of the products, wherein the positioning surface and/or the supporting elements forming the supporting surface are or can be coupled with the load receiver. Particularly preferable is an embodiment in which only one of the two surfaces is coupled with a load receiver, whereby the weighing system is simplified. However, also conceivable is the case in which the two surfaces are carried in each case by one load receiver, so that the weight differences resulting from the transfer of products from one surface to the other surface can be acquired by the two load receivers independently of one another and thus be evaluated redundantly.

A "load receiver" moreover should be understood to mean a component or a group of components used to supply a weight force introduced into the component(s) to one or more force measurement sensors. In weighing technology, the distinction is made between the cases in which the entire weight force of a product or of a group of products, which is to be acquired, is acquired only by a single sensor ("single point") and the cases in which the weight force to be acquired is acquired distributed over several sensors ("multi point"). In the sense of the invention, "load receiver" should cover the two variants and designate the means that are provided for transferring the weight force to be measured currently to one or more sensors.

According to the invention, the support surface and the positioning surface can be moved in a partial movement relative to one another, so that, thereby, a selectable number (i) of the products is transferred from the positioning surface to the supporting surface or vice versa, in order to acquire the change in the weight force resulting therefrom. The selectable number (i) of products can here be in the range of 0<i<m according to the invention. This means that, in the course of a partial movement, a number of (i) products goes from the subset (k) into the subset (n), while the other products remain in their respective subset. As a result of relative movement of the positioning surface and the supporting surface with respect to one another, the weighing system according to the invention can thus lift a selectable number (i) of products completely from the surface that is coupled with a load receiver or place them on said surface. The weight of the transferred product(s) (i) is derived from the weight values acquired before and after. This system differs from the prior art, among other factors, in that the number (i) of the products to be transferred or to be weighed thereby is freely selectable. On the other hand, the known teachings only allow the joint moving (and weighing) of all of the products which are located on a support zone corresponding to the positioning surface.

Preferably i=1, so that, in the course of the partial movement, exactly one product is transferred from one surface to the other surface, and due to the weight difference occurring in the process, the weight of this one product can be determined. In contrast to the prior art, it is therefore possible to weigh, in a targeted manner, one or more products from a group of products resting on a surface, while the other products remain unchanged on the surface.

In an advantageous embodiment of the invention, it is provided that the supporting surface encloses an angle $\alpha \neq 0$ with the positioning surface. Thereby, it is ensured that a translational relative movement of the two surfaces with respect to one another leads to the fact that a section of the positioning surface, which lies at first above or below the supporting surface, lies below or above said supporting surface after the shifting. Preferably, but not necessarily, the two surfaces are of planar design. Planar surfaces have a structurally simple design. In particular, one of the two surfaces can extend horizontally, while the other surface is arranged at a slight inclination with respect to it. Preferably, the relative movement of the surfaces with respect to one another occurs in such a manner that one surface is shifted in a direction running perpendicularly to the other surface, which can be done using a simple lifting mechanism. However, also conceivable is an embodiment of the invention in which the supporting surface or the positioning surface or the two surfaces is/are not of planar design, but instead has/have a predeterminable and preferably variable topography. During a relative movement of such surfaces with respect to one another, different partial areas ("islets") of the individual surfaces can mutually penetrate increasingly or decreasingly. It is thereby possible to transfer the products resting on the individual partial areas in the course of the partial movement from one surface to the other surface, while products arranged adjacently around remain on their surface. Depending on the format and the arrangement or positioning of all the products provided, this type of transfer can be preferable in comparison to the case in which products lying directly side by side are transferred sequentially from one surface to the other surface.

In addition, it is conceivable to move the two surfaces along any non-translational curve relative to one another, in order to generate, depending on the shape of the surfaces, certain penetration patterns in a targeted manner, or in order to move certain areas of one surface through the other surface. By a suitable combination of surface shapes and movement curves, the products resting on one surface can be transferred in any order, in selectable groups or patterns, to the other surface.

Some embodiments of the invention provide that the supporting surface and the positioning surface are of planar design and inclined with respect to one another by an angle α. The inclination here may occur precisely in or precisely transversely to the conveyance direction in which the products are supplied or transported. In the first case (inclination transverse to the conveyance direction), the upper ends of the individual support elements lie at different heights along a straight line that extends transversely to the conveyance direction and is inclined with respect to the positioning surface. By moving the supporting elements up and down relative to the positioning surface, any selectable number (j) of the upper ends of supporting elements adjacent to one another protrudes upward through the positioning surface, in order to lift the products from the positioning surface there. Transversely to the conveyance direction, additional products (provided in multiple lanes) arranged on the positioning surface remain there on the positioning surface, where the upper ends of the supporting elements, due to the slope of the supporting surface, do not yet project upward beyond the positioning surface. In an additional upward movement of the supporting elements, the upper ends of the supporting elements that additionally pass through the positioning surface lift additional products from the positioning surface, so that, sequentially, several products, arranged adjacently with respect to one another transversely to the conveyance direction, can be lifted from the positioning surface. In the downward movement of the supporting elements relative to the positioning surface, the products accordingly are lowered sequentially onto the positioning surface and deposited completely there.

The supporting elements can also lie side by side in groups, comprising in each case supporting elements of the same height within each group. In these implementations the supporting elements of a group then always pass jointly through the positioning surface, for example, in order to be able to lift the products from the positioning surface without thereby putting them in a slanted position. This is reasonable, for example, where the products being weighed are unclosed bottles or other containers.

An alternative embodiment of the invention provides that the inclination of the supporting surface relative to the positioning surface extends in the conveyance direction rather than transversely thereto. In these embodiments, the slope of the supporting surface may be generated not by individual supporting elements protruding upward at different heights, but rather by an upper end of the supporting element extending at an inclination in the conveyance direction. This embodiment is suitable for sequential weighing, that is to say for weighing of products provided one after the other in the conveyance direction. Thereby, it is possible that some or all of the supporting elements protrude upward with a first section of the upper ends through the positioning surface, while a second section of the same upper ends lies below the positioning surface. Due to the lifting or lowering of the supporting elements relative to the positioning surface, all the supporting elements jointly project by a certain amount (corresponds to the "first section") beyond the positioning surface, so that, depending on the lifting height, they can accordingly raise more or fewer products from the supporting surface or lower more or fewer products onto said supporting surface. These two variants as to the nature of the supporting surface are explained in greater detail in the figure examples.

Preferably, the supporting elements are formed as small, vertical metal plates (prongs) that lie side by side in a comb-like manner and the upper ends of which are formed, for example, by runners that jointly form the supporting surface. Such supporting elements have a longitudinal orientation that can extend in or transversely to the conveyance direction. One or two such supporting elements lying side by side can already be enough to carry one or more products, that is to say to lift the products from the positioning surface or lower them onto the positioning surface. Additionally or alternatively, supporting elements can also be of point-shaped design, so that they can protrude in a matrix-like manner through corresponding recesses in the positioning surface. In particular, for this purpose, one can consider using small vertical columns or rods of different or identical length arranged parallel which, depending on length or fastening, together form, by means of their upper ends, a supporting surface that is planar or of any shape.

According to an advantageous embodiment of the invention, the weighing system comprises a transport means with several transport elements arranged parallel to one another for the support and conveyance of the products in a conveyance direction X. The area of support of the products, in the conveyance direction X and in a width direction Y extending transversely thereto, defines the positioning surface, wherein the supporting elements can be moved up and down relative to the transport elements between said transport elements in a direction that is preferably perpendicular with respect to the positioning surface and preferably vertical. Two embodiments can be distinguished here:

a) The transport elements extend in the conveyance direction, so that the supporting elements protruding between the transport elements are also oriented in the conveyance direction. The transport elements can be formed, for example, by several belts that extend parallel to one another and are spaced apart transversely to the conveyance direction, in order to leave room for the supporting element protruding between the belts.

b) The transport means extend transversely to the conveyance direction. Here it is possible, for example, to use rolls arranged one after the other in the conveyance direction with axes oriented transversely to the conveyance direction. These rolls as well are spaced apart from one another in such a manner that supporting elements can protrude through the interstices.

The two variants a) and b) allow the formation of a supporting surface that is inclined transversely to the conveyance direction or in the conveyance direction, in that the supporting elements are formed with different maximum heights and in that the upper end thereof is in each case designed with a slope that corresponds to the inclination of the supporting surface relative to the positioning surface.

The transport means can be driven via at least one drive, in order to provide or further transport the products to be weighed or the products that have already been weighed. The drive can drive several parallel belts, in that it engages, for example, with a shaft around which all of the belts circulate. Also, rolls lying one after the other in the conveyance direction can be driven, for example, via a jointly used chain or pipe motors in the rolls.

The supporting elements can be moved up and down in a direction perpendicular to the positioning surface. This direction may also oriented vertically, i.e., towards the center of the earth, so that the positioning surface extends horizontally.

For the generation of the relative movement between the supporting elements or the supporting surface, on the one hand, and the transport elements or the positioning surface defined by them, a lift drive may be provided, which can be actuated for lifting and/or lowering the transport means and/or the supporting elements. The actuation can occur as a function of the selectable number (i) of the products to be transferred in the course of the lifting movement from one surface to the other surface.

Advantageously, the control of the lifting movement occurs as a function of the signals output by the weighing cell coupled with the at least one load receiver. Thus, the end of a lifting movement can be brought about, for example, by the fact that the weight value output by the weighing cell along a defined lifting path changes only insignificantly or within predeterminable tolerances. This can be considered to be an indication that, in the course of the lifting movement, a product has been transferred completely from one surface to the other surface, while, however, another product has not yet been acquired or should not yet be acquired by the relative movement of the two surfaces. A change or the relative constancy of a measured value during a relative movement of supporting surface and positioning surface with respect to one another can therefore be used as a criterion for the control of the relative movement or of the lift drive. Alternatively or additionally, the relative movement can also be controlled taking into consideration the position of individual products on one or both surfaces, wherein the position can be determined, for example, by optical detection means. Thus, it would be possible to detect, for example, when a certain product, a certain number of products, or all the products have been transferred completely from one surface to the other surface, in order to determine a weight value and/or to end the movement of the surfaces with respect to one another or to reverse or stop said movement. A certain weight value or the temporal weight course can also be used as a weight trigger in order to trigger the further transport of the products.

An advantageous embodiment of the invention provides that either the positioning surface or the supporting surface loads precisely one load receiver, while the lift drive moves either the respective surface carried by the load receiver or the respective other surface. The relative movement of the two surfaces with respect to one another can be generated thereby in a simple manner, in that one of the two surfaces is held substantially stationary, while the other surface is moved. In these embodiments, which of the two surfaces is moved by the lift drive and which is not should not play any role here. Also conceivable is a combination drive that moves the two surfaces relative to one another and at the same time also relative to a stationary reference system. At the same time, it is sufficient in a simplest embodiment if only one of the two surfaces is coupled with a load receiver. Here too, this can pertain to the surface moved by the lift drive or the surface that is arranged substantially stationary. Also conceivable is, for example, an embodiment in which the supporting surface formed by the supporting elements is carried both by the lift drive and also by the load receiver, while the positioning surface remains stationary. Here, the load receiver can carry the lift drive which in turn carries the supporting elements. Alternatively, the lift drive could carry the weighing cell with its load receiver on which in turn the supporting elements are arranged.

A separation of the two functions is also possible, in such a manner that one of the two surfaces (more precisely: the components forming the surfaces) is weighed, while the other surface is driven by the lift drive for the relative movement. ("Stationary," pertaining to a surface, here does not mean that said surface is not carried by a load receiver, and it can therefore experience slight position changes in space during loading. "Stationary" merely means that the surface in question is not actively moved by a lift drive.)

Some preferred embodiments of a weighing system according to the invention provide that precisely one of the two surfaces (supporting surface or positioning surface) is coupled with a load receiver, while the other one is not. Due to the transfer of one or more products from one surface to the other surface, there is a difference in weight force received by the load receiver, which corresponds to the weight force of the products transferred in this step (total weight of all the products transferred in this step). If only one product is transferred, the difference in weight force corresponds precisely to the weight force of the product in question.

An additional embodiment of the invention in contrast provides that both the positioning surface and the supporting surface are each coupled with a load receiver, each belonging to weighing cells operating separately from one another. Thereby, the weighing method according to the invention, yet to be described below, can be carried out redundantly, since the transfer of a product from one surface to the other surface is detected independently by the two load receivers. The weighing method, for all the (m) products, can also be carried out in an accelerated manner with such a device, since the respective acquired weight forces of the (k) products resting on the positioning surface and the (n) products resting on the supporting surface in each case add up to the total weight of all of the (m) products.

Naturally, several of the above-mentioned weighing systems can be used jointly in a weighing installation, in order to additionally increase the product throughput.

The particularly advantageous property of a weighing system according to the invention is revealed in the performance of a weighing method using such a weighing system for weighing a number (m) of products. The weighing method here comprises at least the following steps:

a) The (m) products are placed on the positioning surface and/or the supporting surface. Although, at the beginning of the method, advantageously, the (m) products are all resting on the positioning surface or all resting on the supporting surface, their division into two subsets, as described above, is also conceivable. However, below, the case will be described in which all the (m) products first rest on the positioning surface and accordingly no product rests on the supporting surface. This state is achieved, for example, after a transport means transports several products side by side and/or one after the other into a preparation area and stops there.

For this purpose, the transport means can comprise several belts or rolls on which the products lie and that define the positioning surface in the conveyance direction (X) and width direction (Y) extending transversely thereto. A group of supporting elements, the upper ends of which define the supporting surface, first lies completely below the positioning surface. Furthermore, it is assumed that the supporting elements and the supporting surface defined thereby are carried by a load receiver that introduces a weight force acting on the supporting surface into a weighing cell, in order to output a measured value corresponding to the weight force.

b) Via a lift drive that moves the supporting elements, the supporting surface is then lifted upward in the vertical direction relative to the positioning surface, where they completely lift the first product from the positioning surface, until the product introduces its weight force exclusively into the supporting surface or the supporting elements and the load receiver. This movement, in which at least one product is transferred from one surface to the other surface, can also be referred to as partial movement. From the difference in the weight force before and after transfer of the product, which is acquired by the weighing cell, the weight of the product can be determined.

As explained above, the complete transfer of a product from one surface to the other can be detected in that the weight value acquired does not change substantially in a defined narrow time period in spite of a further upward movement of the supporting surface.

The products can be provided or transported further in different manners. In addition to belts or bands, grippers, chutes, robots, suctioning devices, etc., can also be used.

The supporting elements can also be arranged as eccentric elements on a common axis, wherein adjacent eccentric elements or groups thereof are arranged offset in the rotation angle with respect to one another around the axis. By rotating the axis, the eccentric elements can penetrate one after the other through the positioning surface and lift individual products therefrom. With continued rotation, not only are additional products lifted off, but at same time the products received previously by the eccentric elements are advantageously conveyed further tangentially to the rotation direction, that is to say in the conveyance direction (X).

It is particularly advantageous in comparison to the prior art that, subsequently, an additional product can be lifted from the positioning surface and transferred to the supporting surface, in that the supporting elements continue their upward movement, engage under the next product and completely lift it off. The weight of the product transferred in this additional relative movement, that is, next partial movement, can again be deduced from the acquired difference in weight values. In an additional upward movement of the supporting elements, in another partial movement, the next product can then be taken over by the supporting surface and so on. In contrast to the prior art, in which, for weighing purposes, in all cases it is only possible to lift or deposit all the products to be weighed simultaneously, the design of the supporting elements according to the invention allows the targeted transfer of a selection of products (preferably of exactly one product) for the weighing, while the other products remain on their respective surface. Thus, using only one weighing cell and one lift drive, the individual weights of a whole number (m) of products can be completely detected in successive partial movements, whereby costs are saved and the weighing can be carried out in an accelerated manner.

Advantageously, the individual partial movements can be combined into a continuous weighing maneuver, in that, in the course of a single movement of the supporting surface relative to the positioning surface, all of the products are transferred successively from one surface to the other surface. Thus, the lift drive generating the relative movement could be moved from a lowest position into a highest position, wherein, during this movement, the supporting surface penetrates the positioning surface in such a manner that all the products are lifted here one after the other from the positioning surface or taken over by the supporting surface.

Between the individual partial movements, the relative movement of the surfaces with respect to one another can be stopped (static weighing). This can occur in order to wait for the settling of a measured value. Alternatively, a fixed time period can also be prespecified, after the lapse of which the measured value acquired is then assumed to be sufficiently accurate and processed, or is characterized as insufficiently accurate or discarded.

Alternatively, the individual partial movements can also occur directly after one another, so that the relative movement of the surfaces occurs continuously, that is to say interruption-free.

The continuous movement can occur monotonously, that is to say without reversal of direction, but with variable speed (for example, slowed speed at the weighing time). However, in particular, it can also occur with constant speed. A repeated up and down movement of one surface relative to the other for the purpose of weighing all (m) products exclusively individually is not necessary according to the invention. It is not necessary to individualize (thin out) the products in the product stream so that only one product loads the load receiver during the weighing.

Advantageously, the method also makes it possible to directly further transport the products to be weighed after they have been transferred completely from one surface to the other surface in a weighing maneuver, that is to say without first returning them again to their starting surface. Then, the provision of the products, for example, on the positioning surface, could occur, and, after the transfer to the supporting surface, the products could be transported further directly from there with time savings, using, for example, a gripper, robot, slider, chute, etc.

Moreover, the next product group on the supporting surface could be provided, so that the next weighing maneuver can occur in the reverse lifting direction compared to the previous weighing maneuver, and the products would lie on the positioning surface after the completion of this weighing maneuver. For this group, the removal would then occur from the positioning surface. Since weighing can occur with each lift stroke or counter-lift stroke, the weighing can be accelerated overall.

The mentioned method can be accelerated additionally in that the two surfaces in each case are carried by a separate load receiver with associated weighing cell. In this case, it is sufficient if all the products except for the last product are transferred from one surface to the other surface, since the weight force of the last product remaining on the original surface can be read directly via the associated weighing cell.

Although it appears advantageous to carry out the method according to the invention so that all the products to be weighed are transferred one after the other from one surface to the other surface, this does not have to occur necessarily. It is also conceivable to acquire the weight of only some of the (m) products, while no such weight acquisition occurs for the remaining products. This can be advantageous in order to randomly acquire weight values so as to ensure compliance with a minimum weight for a group of products, etc. It is also possible to not provide all the products completely on the positioning surface or the supporting surface (m=n or m=k) at first. Instead, depending on the provisioning possibilities for the products, it is also conceivable to divide the quantity (m) into two subsets (k, n) on the positioning surface and the supporting surface. Then, due to the relative movement in a first direction, all (n) products could first be transferred successively from the supporting surface to the positioning surface (k=m), in order to subsequently transfer all the products completely to the supporting surface, in reversed movement. Naturally, the loading of the surfaces or the relative movement thereof can also occur in the reverse direction.

The above-mentioned method example was based on the fact that the supporting elements and the supporting surface formed by them can be moved by a lift drive and at the same time constitute a preload for the load receiver of the weighing cell. However, this is only an embodiment variant, since, instead of the supporting surface, the positioning surface can also be designed so that it can be lifted or lowered, or so that it can itself be coupled with a load receiver, while the supporting surface remains substantially stationary.

The inclination of the supporting surface relative to the positioning surface can also be selected as desired, wherein an advantageous design provides an inclination that is precisely in the conveyance direction or precisely transverse thereto, as illustrated in the figure examples. However, a particular embodiment of the weighing system according to the invention and of the method to be carried out thereby provides that the supporting surface has an inclination both in the conveyance direction and also in a direction transverse thereto. This leads to the fact that, during the relative movement of the two surfaces with respect to one another, the products are transferred simultaneously or successively from one surface to the other surface, said products being provided both side by side and also lying one after the other (in multiple lanes and/or sequentially), that is to say in a matrix-like manner in a two-dimensional field. Due to a skillful arrangement of the products and a shape of the two surfaces that is adjusted thereto, it then becomes possible to determine the weight of each individual product, even if these products are provided in a two-dimensional arrangement. This is the case when the partial movements succeeding one another in each case transfer precisely one additional product from one surface to the other surface, wherein this product can lie, in particular, in the same X or Y position as the product transferred previously. By means of this method, a large quantity (m) of products arranged in a matrix-like manner can be acquired completely in a single relative movement.

The number (m) of products to be weighed can comprise products of different geometric shape, so that an adaptation to specific product shapes is not necessary. Due to the relative movement between the positioning surface and the supporting surface, the respective product is transferred by means of its lower side from one surface to the other surface, wherein the additional dimensions of the product are unimportant. For the function according to the invention, it is only necessary that the product (more precisely: its weight force) can be transferred completely from one surface to the other surface. This absence of formatting allows the versatile use of the weighing system, including for differently dimensioned products.

The spatial orientation of the products can also be selected freely. This means that a product can be provided in any rotation position and on any of its side surfaces. Special orientation means can advantageously be dispensed with.

An additional advantage of the invention is that the products can be weighed individually, although they are provided in groups on the positioning surface or the supporting surface. Before the start of the weighing process, the products are arranged in a defined spatial association with respect to one another on the positioning surface or the supporting surface, in particular with regard to the arrangement of the products with respect to one another in or transversely to the conveyance direction. This arrangement is also substantially maintained during the weighing process, except for a possible slight lateral tilting of a product during the transfer from one plane to the other. In contrast to the prior art, for the weighing, none of the products is spatially isolated from the group in the sense that, in particular, its spacing in the horizontal direction from other products of the group has to be changed so that it can be weighed.

In the course of a weighing process according to aspects of the present invention, the products are in fact transferred partially or completely from the positioning surface to the supporting surface or vice versa, but the horizontal spacings of the products among one another and with respect to the product stream are not substantially changed. This applies, on the one hand, when the weighing process is considered to have been completed as soon as all the products have been transferred from their original surface to the respective other surface. However, this applies particularly when the products, after they have been transferred to the other surface, are transferred back to their starting surface. This can be appropriate if the products are provided first with the aid of transport elements on the positioning surface, then lifted one after the other by means of the supporting surface for the acquisition of the individual weight values, and finally deposited again, in a reverse movement, on the positioning surface so that they can subsequently be transported further. The arrangement of the products with respect to one another, before and after this weighing process, is advantageously unchanged. Therefore, a whole group (m) of products can be weighed individually, without the products changing their position with respect to one another. In contrast, in the prior art, precisely in the start-stop method, the products to be weighed are frequently individualized from a product stream and subsequently returned into the product stream, wherein the spacing of the products with respect to one another before the weighing process needs to be considerably changed and accordingly controlled or corrected on a regular basis.

Advantageously, a weighing system according to the invention and the associated method are suitable for weighing products that are provided in any arrangement on the positioning surface and/or the supporting surface (freely selectable support). In particular, the lateral spacings of the individual products with respect to one another can be freely selected. Thus, products can be placed freely on the surfaces and some of them may be closer together than others. This is achieved by the support areas that overall form a surface. Special receiving means for acquiring and weighing the products at precisely predefined sites can advantageously be dispensed with. Furthermore, due to the principle of mutually penetrating surfaces, the weighing system makes it possible that, if necessary, a product is returned again to the other surface in such a manner that it lies on this starting surface in a position deviating from its original position. Special receiving means for these products are thus completely superfluous, which considerably simplifies the system.

These and other advantages and features of the invention will be apparent from the following description of representative embodiments, considered along with the accompanying drawings.

DESCRIPTION OF REPRESENTATIVE EMBODIMENTS

Figures 1, 2:
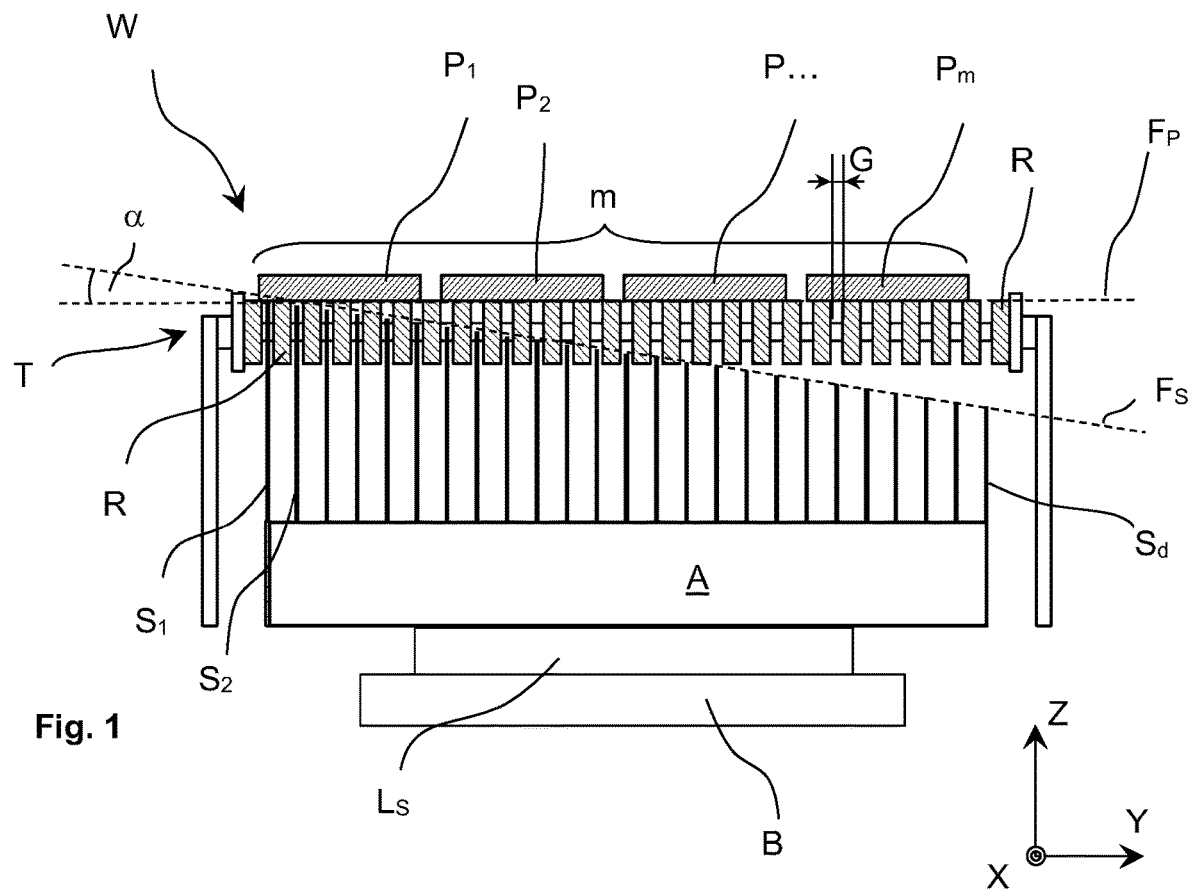
FIG. 1 shows a diagrammatic cross-sectional representation of a weighing system according to the invention.
FIG. 2 shows a partial view of the supporting elements.

FIG. 1 shows, in a diagrammatic cross-sectional representation, components of a weighing system (W) according to an embodiment of the invention. The weighing system (W) comprises a transport means (T) to which several belts (R) belong, which extend parallel to one another. The belts (R), which lie side by side, can be driven by a driving mechanism not represented in further detail, in order to convey products ($P_1$-$P_m$) lying on the belts (R) in a conveyance direction (X) (in FIG. 1, the conveyance direction (X) extends perpendicularly to the plane of the drawing). The upper side of the belts (R) form a positioning surface ($F_P$), on which a number (m) of products (P) to be weighed are placed. In the embodiment example according to FIG. 1, four products (P) are provided in multiple lanes, that is to say that they lie side by side in a width direction (Y) extending transversely to the conveyance direction (X).

The transport means (T) can be moved up and down by a lift drive, which is not represented, in vertical direction (Z), so that the belts (R) are accordingly moved along with the products (P) lying on them. The belts (R) are spaced apart from one another in the width direction (Y) in such a manner that a small gap (G) exists in each case between adjacent belts.

Under the positioning surface ($F_P$), a holder (A) is provided, which carries a number (d) of supporting elements (S) protruding vertically upward. The supporting elements (S) are implemented as small metal plates (here in the form of individual prongs) that extend parallel to one another in conveyance direction (X) and are spaced apart from one another in width direction (Y) so that each supporting element can protrude in a contact-free manner through one of the gaps (G) between the belts (R). The holder (A) carrying the supporting elements (S) is itself coupled with a load receiver ($L_S$) that introduces the force into a weighing cell (B) that is represented diagrammatically. The weighing cell (B) is designed for acquiring the weight force introduced into the load receiver ($L_S$) and for outputting an associated measured value.

As can be seen in FIG. 2 in an enlarged view, the supporting elements (S) lie side by side and are numbered consecutively from 1 to d. Each supporting element (S) has an associated upper end (E). In the embodiment example according to FIGS. 1 to 6, the upper ends ($E_1$-$E_d$) of each supporting element ($S_1$-$S_d$) extend in conveyance direction (X). Together, the upper ends ($E_1$-$E_d$) form a supporting surface ($F_S$) that is designed for supporting one or more products ($P_1$-$P_m$). The supporting elements ($S_1$-$S_d$) are designed with a height that in FIG. 2 decreases from left to right, so that the supporting surface ($F_S$) formed jointly by the upper ends ($E_1$-$E_d$) is inclined by an angle α with respect to the positioning surface ($F_P$).

FIG. 1 shows that the supporting elements ($S_1$-$S_d$) protrude partially into the gap (G) between the belts (R) of the transport means (T). The first supporting element ($S_1$) here lies with its upper end ($E_1$) directly below the product ($P_1$), but without touching said product. In the state represented in FIG. 1, all the products ($P_1$-$P_m$) rest completely on the positioning surface ($F_P$) and introduce their weight force exclusively into the belts (R) or the transport means (T).

Figure 3:
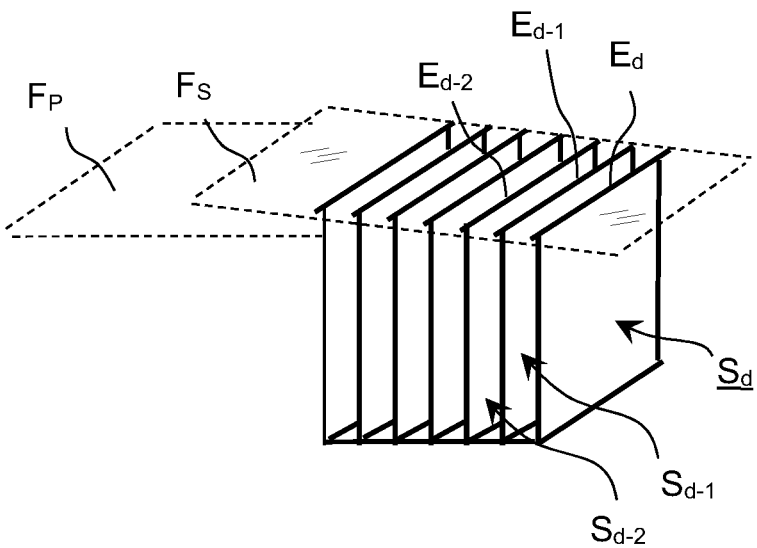
FIG. 3 shows a partial perspective view of the supporting elements.

FIG. 3 shows a simplified perspective view of a few supporting elements. The vertically upward protruding supporting elements ($S_1$-$S_d$), by means of their upper ends ($E_1$-$E_d$), form the supporting surface ($F_S$). Due to the decreasing height of the individual supporting elements (S) between the supporting surface ($F_S$) and the positioning surface ($F_P$), an inclination exists, which is described by the angle α shown in FIG. 2.

Figure 4:
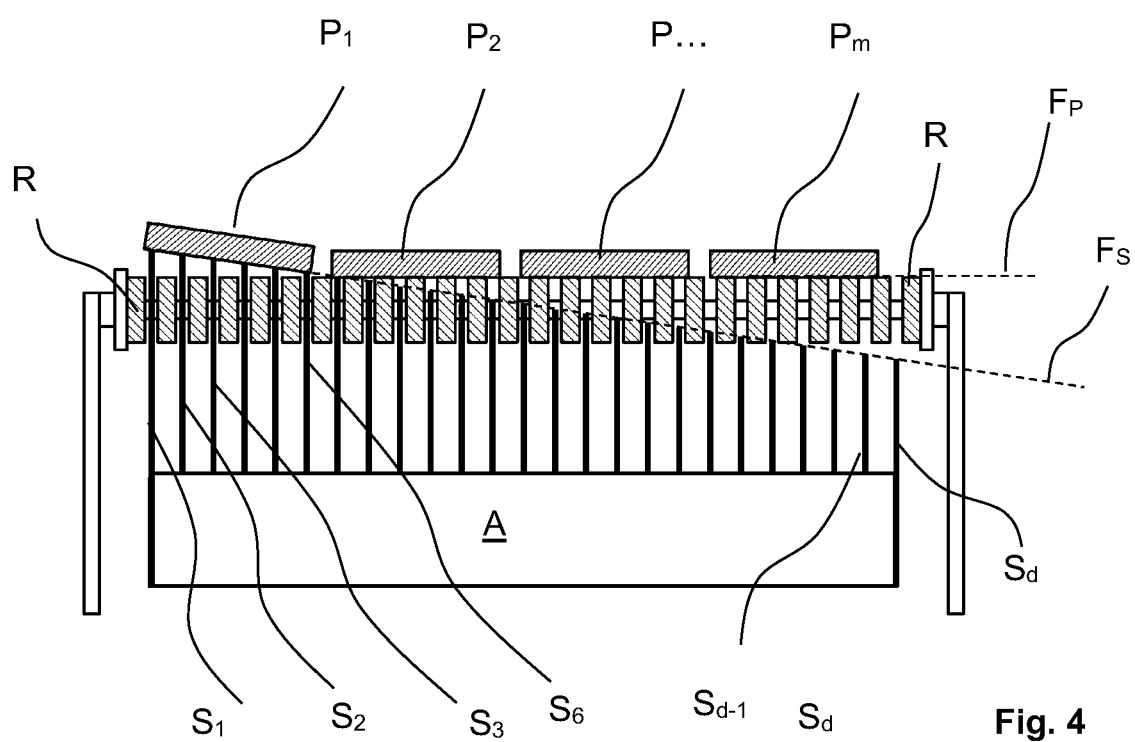
FIG. 4 shows a first condition in the course of a weighing maneuver.

The holder (A) (not shown in FIG. 3) with its supporting elements (S) can be moved relative to the transport means (T) in a direction (Z) perpendicular to the width direction (Y) and the conveyance direction (X). Such a movement leads to the shifting of the upper ends ($E_1$-$E_d$) of the supporting elements upward or downward between the belts (R). In an upward movement of the supporting elements relative to the transport means (T), as represented in FIG. 4, the first supporting elements engage under the first product ($P_1$) and lift it from the positioning surface ($F_P$). Thus, the weight force of the product ($P_1$) is introduced via the supporting elements supporting this product into the load receiver ($L_S$) (not shown here), wherein FIG. 4 represents precisely the condition in which the product ($P_1$) has been lifted completely from the positioning surface ($F_P$) and rests only on the upper ends (E) of the associated supporting elements ($S_1$-$S_6$). FIG. 4 thus shows the end of a first partial movement, in which precisely one product was transferred or delivered from the positioning surface ($F_P$) to the supporting surface ($F_S$). From the difference in the measured value output by the weighing cell before and after this partial movement, the weight of the product ($P_1$) can be determined. At this time, the additional products ($P_2$-$P_m$) rest unchanged on the positioning surface ($F_P$).

Figure 5:
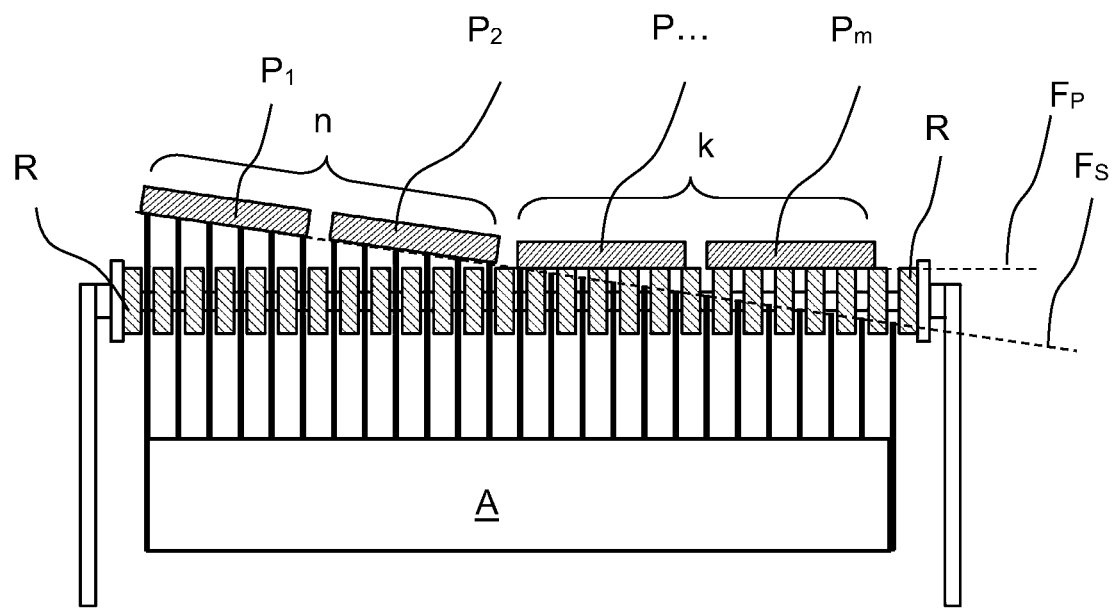
FIG. 5 shows a second condition in the course of the weighing maneuver.

FIG. 5 shows the situation after the holder (A) has been raised further in an additional partial movement relative to the transport means (T). Here, in addition to the first product (P$_1$), the second product (P$_2$) has also been completely received by the supporting element (S), so that its weight force is introduced additionally into the load receiver (L$_S$), which is no longer represented in FIG. 5. The weight of the second product (P$_2$) can again be determined from the calculated difference between the measured values output by the weighing system.

Figure 6:
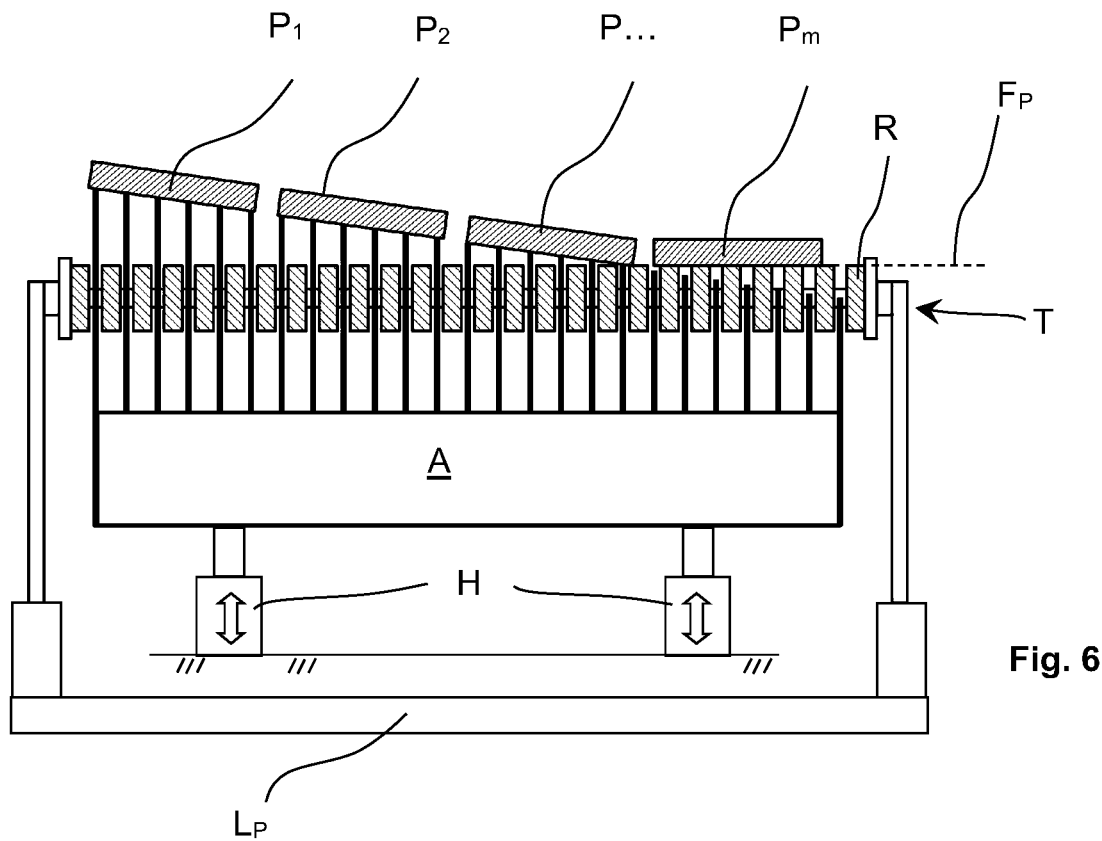
FIG. 6 shows a third condition in the course of the weighing maneuver.
Figure 7:
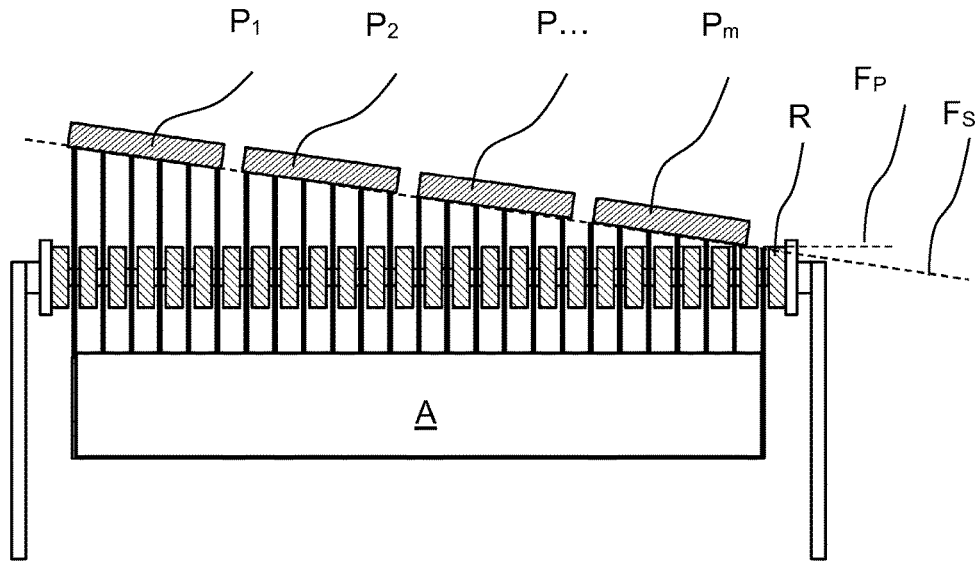
FIG. 7 shows a fourth condition in the course of the weighing maneuver.

FIGS. 6 and 7 show the situation after two additional partial movements, in which additional products (P) have been transferred from the positioning surface (F$_P$) to the supporting surface (F$_S$) or the associated supporting elements. For the case represented in FIG. 7, in which the number (m) of the products to be weighed is four, after four successive partial movements, all of the products have been transferred from the positioning surface (F$_P$) to the supporting surface (F$_S$) and now they load exclusively the load receiver (L$_S$) represented as an example in FIG. 1. All the individual weights of the products are thus known. It is easily seen that the individual partial movements that are represented in FIGS. 4-7 can also be combined into a continuous weighing maneuver (perhaps with a constant speed of relative movement), in that the holder (A) is lifted in a single movement relative to the transport means (T) from the bottom upward, whereby the individual weight of all the products (P$_1$-P$_m$) can be acquired promptly and accurately. It is noted that the individual weight of each of the products (P$_1$-P$_m$) are acquired while the products maintain the same relative position in the X-Y plane.

Due to a subsequent movement running in the opposite direction, in which the holder (A) is lowered again relative to the transport means (T), the individual products (P$_1$-P$_m$) are deposited in reverse order onto the positioning surface (F$_P$), after which they can be conveyed further jointly by the drive of the belts (R) and so that a new group of products can be provided on the positioning surface (F$_P$).

Alternatively, instead of being lowered again onto the positioning surface (F$_P$), the products could also be removed in the raised position directly from the supporting surface (F$_S$) or transported further, for example, by means of a slider or gripper. Moreover, it would be possible to position a new group of products to be weighed on the lifted supporting surface (F$_S$), so that, by subsequent lowering, an additional weighing maneuver can be immediately carried out. As a result, a considerable time savings would be achieved for the entire weighing sequence, since, with each lift and counter-lift stroke, a weighing maneuver could be performed in each case.

In FIG. 1, the case was represented in which the supporting elements (S) or the supporting surface (F$_S$) formed thereby are carried as a preload by a load receiver (L$_S$). FIG. 6, on the other hand, shows as an example another variant in which, instead, the transport means (T) and the positioning surface (F$_P$) formed by its belt (R) rest as a preload on a load receiver (L$_P$). A lifting mechanism (H) is used for moving the holder (A), with the supporting elements (S), up and down relative to the positioning surface (F$_P$). In this case, the weight force of the individual products is not acquired via the supporting surface (F$_S$), but via the positioning surface (F$_P$). In a starting situation corresponding to FIG. 1, the total weight of all the products (P$_1$-P$_m$) would then first be received by the load receiver (L$_P$) carrying the positioning surface. In the course of the upward movement of the supporting surface (F$_S$), with each partial movement in which an additional product is received by the supporting element, the total weight received by the load receiver (L$_P$) is then reduced, wherein the weight of each individual product can again be determined by calculating the difference.

If necessary, the lift drive and the load receiver can also be coupled with the same surface in order, on the one hand, to acquire the weight of this surface and, on the other hand, to move it actively. For this purpose, the lift drive together with the load receiver could form a preload for the weighing cell. Alternatively, the weighing cell together with the load receiver can be carried by the lift drive. In each case, the other surface can then be arranged in a stationary manner.

Figure 8:
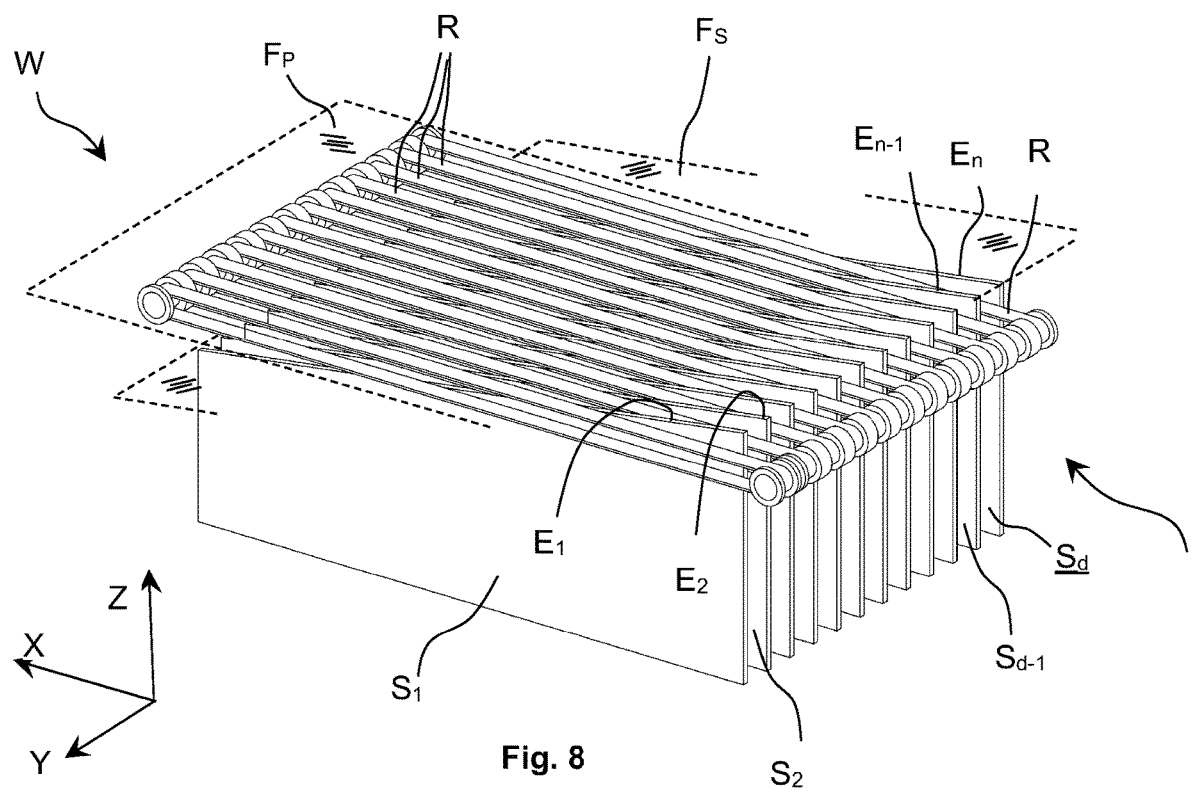
FIG. 8 shows an alternative embodiment of a weighing system according to the invention.
Figure 9:
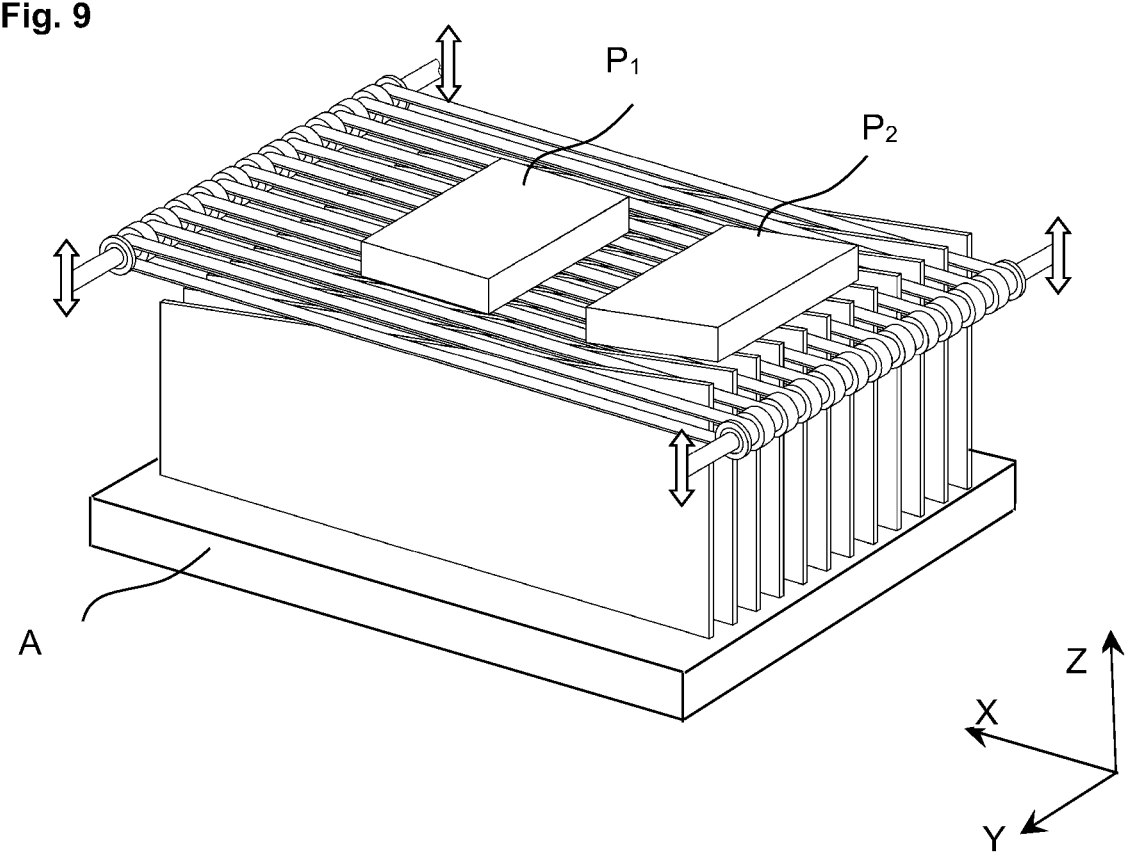
FIG. 9 shows a first condition in a weighing maneuver with a weighing system according to FIG. 8.
Figure 10:
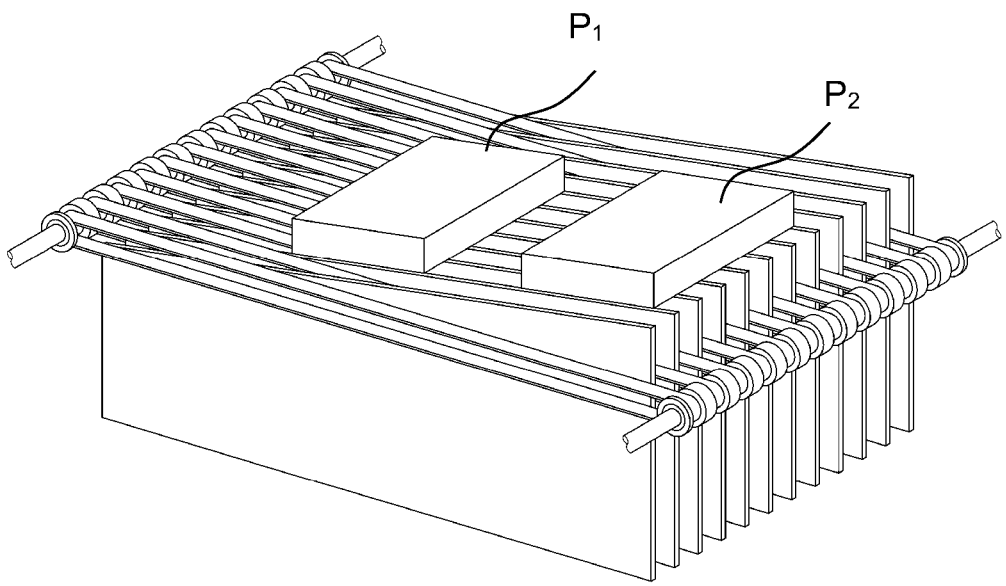
FIG. 10 shows a second condition in the course of the weighing maneuver with a weighing system according to FIG. 8.

In the embodiments according to FIGS. 1-7, the inclination of the supporting surface (F$_S$) runs exclusively transversely to the conveyance direction (X), so that an imaginary intersecting edge between the two planes extends in conveyance direction (X). FIGS. 8-10, on the other hand, relate to a modified embodiment in which the supporting surface (F$_S$) is inclined with respect to the positioning surface (F$_P$) when viewed in conveyance direction (X). In this case, all the supporting elements (S$_1$-S$_d$) are of the same design, wherein their respective upper end (E$_1$-E$_d$) extends at a slant in the conveyance direction. The supporting elements (F$_S$) formed jointly from all the upper ends (E$_1$-E$_d$) thus receive their inclination in conveyance direction (X).

In FIG. 8, the supporting elements (S) are represented in a simplified manner in an arrangement in which a section of their upper ends already protrudes through the positioning surface (F$_P$) formed by the belts (R) of the transport means (T). On the other hand, another section of all the supporting elements (S) still lies below the positioning surface (F$_P$) (both surfaces (F$_P$) and (F$_S$) are indicated with dashed lines). The scheme of the weighing process corresponds to that of FIGS. 1-7, as can be seen, for example, in reference to FIGS. 9 and 10. Recurring reference numerals are omitted in these figures to simplify the view.

FIG. 9 shows the case in which a product (P$_2$) has already been received by the upper ends of the supporting elements, that is to say by the supporting surface (F$_S$). The product (P$_1$), on the other hand, still rests on the positioning surface (F$_P$). In contrast to the embodiment example according to FIGS. 1 to 7, the products are arranged here lying one after the other in the conveyance direction; they are thus provided sequentially. In a movement of the positioning surface (F$_P$) relative to the supporting surface (F$_S$), the products lying successively one after the other in conveyance direction (X) thus arrive from the positioning surface (F$_P$) onto the supporting surface (F$_S$) or vice versa.

In FIG. 9, small double arrows indicate that the transport means (T) with its belts (R) should be capable of being moved up and down in the vertical Z direction by means of a lift drive, not represented in further detail. The supporting elements (S), on the other hand, rest on a diagrammatically represented load receiver (L$_S$).

In contrast to FIG. 9, FIG. 10 shows the case in which the two products (P$_1$, P$_2$) are carried by the supporting surface (F$_S$), and the positioning surface (F$_P$) is not loaded. A subsequent relative movement running in reverse direction would again deposit the two products completely onto the belts (R) of the transport means in order to transport them further and provide new products to be weighed.

The embodiment examples shown in FIGS. 1 to 10 provided that the upper ends of the supporting elements in each case extend in the conveyance direction (X) and in the process can protrude through gaps (G) that are formed by belts or other drive means that also extend in conveyance direction (X). However, the weighing principle according to the invention can be implemented in the same manner with supporting elements oriented transversely to the conveyance direction (X), for example, if the transport means comprises individual transport rolls that lie one after the other in the conveyance direction (X) and extend in width direction (Y) (not represented). The gaps that form between these rolls serve to allow the upper ends of the supporting elements to pass through the positioning surface formed jointly by the rolls, in order to selectively lift products from this surface or deposit them on it. Also, in the case of supporting elements extending transversely to the conveyance direction, the supporting surface formed by the supporting elements can have a slope in conveyance direction (X) or transversely thereto (in width direction (Y)) or simultaneously in both directions. When the supporting elements are lifted or lowered relative to the rolls, then, depending on the inclination direction of the supporting surface, the products lying one after the other in the width direction or in any arrangement can be lifted or lowered one after the other.

Figure 11:
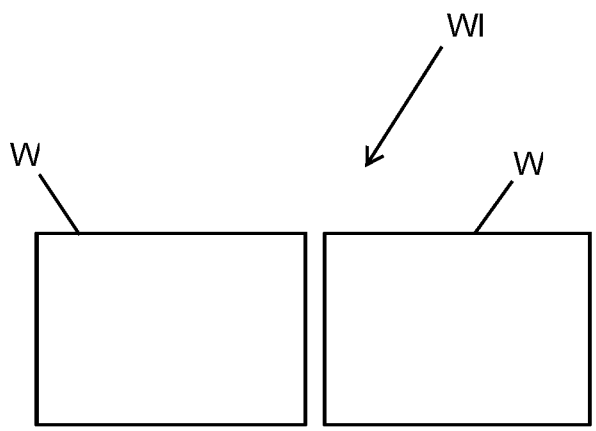
FIG. 11 shows a schematic representation of a weighing installation made up of two weighing systems.

FIG. 11 shows a weighing installation WI including two weighing systems W (described above in connection with FIG. 1 for example) used jointly.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

| List of reference character | |
|---|---|
| $E_1$-$E_d$ | Upper ends of the supporting elements S |
| $S_1$-$S_d$ | Supporting elements |
| W | Weighing system |
| R | Belt |
| X | Conveyance direction |
| Y | Width direction |
| Z | Height direction |
| $F_S$ | Supporting surface |
| $F_P$ | Positioning surface |
| A | Holder for the supporting elements |
| $P_1$-$P_m$ | Products |
| H | Lift drive |
| T | Transport means |
| k | Quantity of products on the positioning surface |
| n | Quantity of products on the supporting surface |
| m | Quantity of products to be weighed |
| α | Angle between positioning surface and supporting surface |
| G | Gap |
| $L_S$ | Load receiver for the supporting surface |
| $L_P$ | Load receiver for the positioning surface |
| B | Weighing cell |
| WI | Weighing system installation |

The invention claimed is:

1. A weighing system for weighing a number of products arranged in multiple lanes or sequentially, or both in multiple lanes and sequentially, the weighing system including:
   (a) a positioning surface configured to support a first subset of the number of products;
   (b) a number of supporting elements, each of the supporting elements including a respective supporting element upper end and the supporting element upper ends together defining a supporting surface configured to support a second subset of the number of products, the second subset of the number of products comprising all of the number of products other than any of the number of products included in the first subset;
   (c) the supporting surface and the positioning surface being configured for a relative movement there between which transfers a selectable number of one or more of the number of products from the positioning surface to the supporting surface or from the supporting surface to the positioning surface; and
   (d) a load receiver operatively associated with one of (i) the positioning surface to receive the weight force of the first subset of the number of products or (ii) the number of supporting elements to receive the weight force of the second subset of the number of products, the load receiver acquiring a change in the weight force of the first subset of the number of products or a change in the weight force of the second subset of the number of products resulting from the relative movement of the supporting surface and the positioning surface.

2. The weighing system of claim 1 wherein the selectable number of one or more of the number of products is one.

3. The weighing system of claim 1 wherein the supporting surface resides at an angle greater than zero degrees to the positioning surface.

4. The weighing system of claim 1 wherein the supporting elements and the positioning surface are movable relative to one another in such a manner that at any given position of the supporting elements relative to the positioning surface a selectable number of from none to all of the support element upper ends protrude above the positioning surface while each other support element upper end resides at or below the positioning surface.

5. The weighing system of claim 1 wherein the supporting elements and the positioning surface are configured for movement relative to one another in such a manner that any selectable number of from none to all of the support element upper ends penetrate through a boundary defined by the positioning surface.

6. The weighing system of claim 1 wherein the supporting elements include vertically oriented prongs that lie side by side in a comb-like manner.

7. The weighing system of claim 1 further including transport means with a number of transport elements arranged parallel to one another for support and conveyance of the number of products in a conveyance direction, the transport elements together defining the positioning surface in the conveyance direction and a width direction, and wherein the supporting elements are movable up and down relative to the transport elements between the transport elements in a height direction that is perpendicular to a plane defined by the conveyance direction and width direction.

8. The weighing system claim 7 further including a lift drive configured to produce the relative movement between the supporting elements and the transport elements, the lift drive being operable for lifting and lowering either the transport means or the supporting elements as a function of the selectable number of one or more of the number of products.

9. The weighing system of claim 8 wherein either the positioning surface is carried by the load receiver and the lift drive is operable to move the positioning surface or the supporting elements are carried by the load receiver and the lift drive is operable to move the supporting elements.

10. The weighing system of claim 7 wherein the transport elements and the supporting elements extend parallel to the conveyance direction or the transport elements and the supporting elements extend transversely to the conveyance direction.

11. The weighing system of claim 1 wherein the load receiver is operatively associated with the positioning surface to receive the weight force of the first subset of the number of products, and further including a second load receiver operatively associated with the number of supporting elements to receive the weight force of the second subset of the number of products.

12. A weighing installation including:
(a) a first weighing system for weighing a first number of products arranged in multiple lanes or sequentially, or both in multiple lanes and sequentially, the first weighing system including,
a first positioning surface configured to support a first subset of the first number of products;
a number of first supporting elements, each of the first supporting elements including a respective first supporting element upper end and the first supporting element upper ends together defining a first supporting surface configured to support a second subset of the first number of products, the second subset of the first number of products comprising all of the first number of products other than any of the first number of products included in the first subset of the first number of products;
the first supporting surface and the first positioning surface being configured for a relative movement there between which transfers a selectable number of one or more of the first number of products from the first positioning surface to the first supporting surface or from the first supporting surface to the first positioning surface; and
a first load receiver operatively associated with one of (i) the first positioning surface to receive the weight force of the first subset of the first number of products or (ii) the number of first supporting elements to receive the weight force of the second subset of the first number of products, the first load receiver acquiring a change in the weight force of the first subset of the first number of products or a change in the weight force of the second subset of the first number of products resulting from the relative movement of the first supporting surface and the first positioning surface; and
(b) a second weighing system for weighing a second number of products arranged in multiple lanes or sequentially, or both in multiple lanes and sequentially, the second weighing system including,
a second positioning surface configured to support a first subset of the second number of products;
a number of second supporting elements, each of the second supporting elements including a respective second supporting element upper end and the second supporting element upper ends together defining a second supporting surface configured to support a second subset of the second number of products, the second subset of the second number of products comprising all of the second number of products other than any of the second number of products included in the first subset of the second number of products;
the second supporting surface and the second positioning surface being configured for a relative movement there between which transfers a selectable number of one or more of the second number of products from the second positioning surface to the second supporting surface or from the second supporting surface to the second positioning surface; and
a second load receiver operatively associated with one of (i) the second positioning surface to receive the weight force of the first subset of the second number of products or (ii) the number of second supporting elements to receive the weight force of the second subset of the second number of products, the second load receiver acquiring a change in the weight force of the first subset of the second number of products or a change in the weight force of the second subset of the second number of products resulting from the relative movement of the second supporting surface and the second positioning surface.

13. A method for weighing a number of products arranged in multiple lanes or sequentially, or both in multiple lanes and sequentially, the method including:
(a) positioning the number of products such that a first subset of the number of products rests on a positioning surface and a second subset of the number of products rests on a supporting surface, the supporting surface being defined by a number of supporting elements and the second subset of the number of products comprising all of the number of products other than any of the number of products included in the first subset;
(b) producing a relative movement between the positioning surface and the supporting surface so as to transfer a selectable number of one or more of the number of products from the positioning surface to the supporting surface or from the supporting surface to the positioning surface; and
(c) acquiring a change in a weight force of the first subset of the number of products or a change in the weight force of the second subset of the number of products resulting from the relative movement of the supporting surface and the positioning surface.

14. The method of claim 13 wherein the selectable number of one or more of the number of products is one.

15. The method of claim 14 further including:
(a) producing an additional relative movement between the positioning surface and the supporting surface for each of an additional selectable number of one or more of the number of products so as to transfer the respective additional selectable number of one or more of the number of products from the positioning surface to the supporting surface or from the supporting surface to the positioning surface until each of the number of products is transferred from the positioning surface to the supporting surface or from the supporting surface to the positioning surface; and
(b) acquiring a change in a weight force of the first subset of the number of products or a change in the weight force of the second subset of the number of products resulting from each additional relative movement of the supporting surface and the positioning surface.

16. The method of claim 15 wherein the relative movement and additional relative movements together individually successively lift all of the number of products either completely from the positioning surface to rest only on the supporting surface, or completely from the supporting surface to rest only on the positioning surface.

17. The method of claim 15 wherein the relative movement and additional relative movements are performed in a continuous weighing maneuver during which a movement direction of the positioning surface relative to the supporting surface remains constant.

18. The method of claim 17 wherein during the weighing maneuver the positioning surface and the supporting surface move with a constant speed relative to one another.

19. The method of claim 17 wherein all of the number of products substantially keep their position relative to one another with respect to a weighing plane during the weighing maneuver, the weighing plane comprising a plane extending substantially perpendicular to a direction of the relative movement and each additional relative movement.

20. The method of claim 15 wherein the number of products include individual products with different formats, or different spatial orientations, or both different formats and different spatial orientations.

* * * * *